United States Patent
Zhou et al.

(10) Patent No.: US 9,479,994 B2
(45) Date of Patent: Oct. 25, 2016

(54) RETRANSMISSION METHOD AND DEVICE

(71) Applicant: Huawei Technologies Co., Ltd., Shenzhen (CN)

(72) Inventors: Mingyu Zhou, Shenzhen (CN); Liang Xia, Shenzhen (CN); Qiang Wu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 152 days.

(21) Appl. No.: 14/319,507

(22) Filed: Jun. 30, 2014

(65) Prior Publication Data
US 2014/0313878 A1    Oct. 23, 2014

Related U.S. Application Data

(63) Continuation of application No. PCT/CN2012/085013, filed on Nov. 22, 2012.

(30) Foreign Application Priority Data

Dec. 30, 2011    (CN) .......................... 2011 1 0456262

(51) Int. Cl.
*H04W 40/14* (2009.01)
*H04L 1/18* (2006.01)
(Continued)

(52) U.S. Cl.
CPC ............. *H04W 40/14* (2013.01); *H04B 7/026* (2013.01); *H04B 7/0686* (2013.01); *H04L 1/0625* (2013.01); *H04L 1/1893* (2013.01); *H04W 72/042* (2013.01)

(58) Field of Classification Search
CPC ... H04L 1/1819; H04L 1/1893; H04B 7/026; H04W 36/08
See application file for complete search history.

(56) References Cited

U.S. PATENT DOCUMENTS

2009/0262678 A1    10/2009  Oyman et al.
2010/0115358 A1    5/2010   Kotecha et al.
(Continued)

FOREIGN PATENT DOCUMENTS

| CN | 101083518 A | 12/2007 |
|----|-------------|---------|
| CN | 101212285 A | 7/2008  |
| CN | 101577612 A | 11/2009 |

OTHER PUBLICATIONS

Fujitsu, "Efficient HARQ Protocol for SIC based DL CoMP," R1-091496, 3GPP TSG-RAN1 #56-BIS, Seoul Korea, Mar. 23-27, 2009, 17 pages.

(Continued)

*Primary Examiner* — Pao Sinkantarakorn
(74) *Attorney, Agent, or Firm* — Slater Matsil, LLP

(57) ABSTRACT

Embodiments of the present invention provide a retransmission method and device. The method includes: controlling, by a network side device, a network side node to send a second space processing mode to a terminal after the network side node receives a negative acknowledgement fed back by the terminal, where the negative acknowledgement is used to indicate that the terminal fails in decoding the downlink data sent by a first node, the second space processing mode is used to indicate a space processing mode applied by the second node to the downlink data, and the second space processing mode is different from a first space processing mode applied by the first node to the downlink data; and controlling, by the network side device, the second node to perform space processing for the downlink data by using the second space processing mode and then retransmit the downlink data to the terminal.

17 Claims, 7 Drawing Sheets

(51) Int. Cl.
*H04L 1/06* (2006.01)
*H04W 72/04* (2009.01)
*H04B 7/02* (2006.01)
*H04B 7/06* (2006.01)

(56) References Cited

U.S. PATENT DOCUMENTS

2010/0246481 A1 9/2010 Aggarwal et al.

2013/0132788 A1* 5/2013 Braun .................. H04L 1/1819
714/750

OTHER PUBLICATIONS

Huawei, HiSilicon, "Further Considerations on RLC Data Split Option of Inter-NB Multi-Point Transmission," R2-113957, 3GPP TSG RAN2 Meeting #75, Athens, Greece, Aug. 22-26, 2011, 3 pages.

* cited by examiner

RETRANSMISSION METHOD AND DEVICE

This application is a continuation of International Application No. PCT/CN2012/085013, filed on Nov. 22, 2012, which claims priority to Chinese Patent Application No. 201110456262.5, filed on Dec. 30, 2011, both of which are hereby incorporated by reference in theirs entireties.

TECHNICAL FIELD

The present invention relates to the field of communications technologies, and in particular, to a retransmission method and device.

BACKGROUND

In a traditional radio communication system, each user equipment (UE) generally communicates with a node equipped with a transceiver apparatus.

In the prior art, after a node initially sends a modulated packet to the UE, the UE decodes the received packet. If the packet is decoded successfully, the UE returns an acknowledgement (ACK) to the node, and the node does not need to send the packet to the UE again; if the UE fails to decode the packet, the UE returns a negative acknowledgement (NAK) to the node, and the node sends the packet to the UE again after receiving the NAK. Such a process goes on until the UE receives the packet and returns an ACK to the node or retransmission times reach a maximum retransmission threshold.

However, if a downlink channel between the node and the UE changes sharply or downlink transmission from the node to the UE suffers severe interference, the retransmission success rate will be low, and system stability is affected.

SUMMARY

Embodiments of the present invention provide a retransmission method and device to improve retransmission success rate and system stability.

In one embodiment, a method for data retransmission is provided. In this example, the method includes controlling, by a network side device, a network side node to send a second space processing mode to a terminal after the network side node receives a negative acknowledgement fed back by the terminal. The negative acknowledgement is used to indicate that the terminal fails in decoding downlink data sent by a first node. The second space processing mode is used to indicate a space processing mode applied by a second node to the downlink data. The second space processing mode is different than a first space processing mode applied by the first node to the downlink data. The method further includes controlling, by the network side device, the second node to both perform space processing for the downlink data by using the second space processing mode and retransmit the downlink data to the terminal.

In another embodiment, another retransmission method is provided. In this example, the method includes performing, by a second node, space processing for downlink data by using a second space processing mode under control of a network side device after a network side node receives a negative acknowledgement fed back by a terminal. The negative acknowledgement is used to indicate that the terminal fails in decoding the downlink data sent by a first node. The second space processing mode is different than a first space processing mode applied by the first node to the downlink data. The method further includes retransmitting, by the second node, the downlink data processed in the second space processing mode to the terminal.

In yet another embodiment, yet another retransmission method is provided. In this example, the method includes feeding back, by a terminal, a negative acknowledgement to a network side node. The negative acknowledgement is used to indicate that the terminal fails in decoding downlink data sent by a first node. The method further includes receiving, by the terminal, a second space processing mode sent by the network side node. The second space processing mode is used to indicate a space processing mode applied by a second node to the downlink data. The second space processing mode is different than a first space processing mode applied by the first node to the downlink data. The method further includes decoding, according to the second space processing mode, the received downlink data that is retransmitted by the second node.

In yet another embodiment, a network side device is provided. In this example, the network side device includes a controller, configured to control a network side node to send a second space processing mode to a terminal after the network side node receives a negative acknowledgement fed back by the terminal. The controller is further configured to control a second node to both perform space processing for downlink data using the second space processing mode and retransmit the downlink data to the terminal. The negative acknowledgement is used to indicate that the terminal fails in decoding the downlink data sent by a first node. The second space processing mode is used to indicate a space processing mode applied by the second node to the downlink data. The second space processing mode is different than a first space processing mode applied by the first node to the downlink data.

In yet another embodiment, a node is provided. In this example, the node includes a processor, configured to perform space processing for downlink data by using a second space processing mode under control of a network side device after a network side node receives a negative acknowledgement fed back by a terminal. The negative acknowledgement is used to indicate that the terminal fails in decoding downlink data sent by a first node. The second space processing mode is different than a first space processing mode applied by the first node to the downlink data. The node further includes a transmitter, configured to retransmit the downlink data processed in the second space processing mode to the terminal.

In yet another embodiment, a terminal is provided. In this example, the terminal includes a transmitter, configured to feed back a negative acknowledgement to a network side node. The negative acknowledgement is used to indicate that the terminal fails in decoding downlink data sent by a first node. The terminal further includes a receiver, configured to receive a second space processing mode sent by the network side node. The second space processing mode is used to indicate a space processing mode applied by a second node to the downlink data. The second space processing mode is different than a first space processing mode applied by the first node to the downlink data. The terminal further includes a processor, configured to decode, according to the second space processing mode, the received downlink data that is retransmitted by the second node.

With the retransmission method and device provided in the embodiments of the present invention, after a first node fails in sending downlink data to a terminal, a network side device determines a second node as a retransmission node, and controls the second node to perform space processing for the downlink data in a way different from the space processing mode of the first node and then retransmit the downlink data to the terminal, thereby improving the retransmission success rate and system stability.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiment of the present invention without creative efforts shall fall within the protection scope of the present invention.

Figure 1:
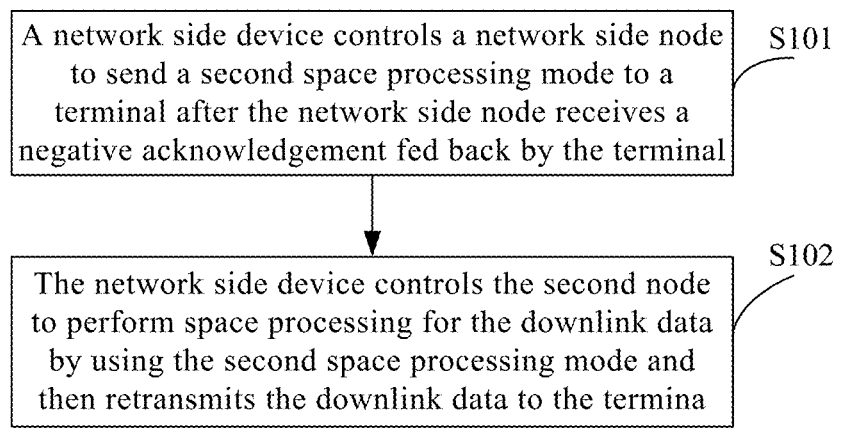
FIG. 1 is a flowchart of a retransmission method according to an embodiment of the present invention.

FIG. 1 is a flowchart of a retransmission method according to an embodiment of the present invention. As shown in FIG. 1, the method includes:

S101. A network side device controls a network side node to send a second space processing mode to a terminal after the network side node receives a negative acknowledgement fed back by the terminal.

The negative acknowledgement is used to indicate that the terminal fails in decoding downlink data sent by a first node, the second space processing mode is used to indicate a space processing mode applied by a second node to the downlink data, and the second space processing mode is different from a first space processing mode applied by the first node to the downlink data.

S102. The network side device controls the second node to perform space processing for the downlink data by using the second space processing mode and then retransmit the downlink data to the terminal.

The subject for performing the above steps is a network side device, and specifically, may be a base station (BS), an evolved NodeB (eNodeB) in a long term evolution (LTE) system, and the like.

In an implementation scenario of this embodiment, the first node may be an initial transmission node, and the second node may be a retransmission node; in another implementation scenario of this embodiment, both the first node and the second node may be retransmission nodes, and the second node may be a node that retransmits the downlink data to the terminal again when the first node fails in retransmitting the downlink data to the terminal.

Specifically, the first node and the second node may be an access point (AP), a remote radio equipment (RRE), a remote radio head (RRH), or a remote radio unit (RRU), and the like.

In an implementation scenario where the first node is an initial transmission node, the first node may encode and modulate the downlink data to be sent to the UE, and then perform space processing for the downlink data by using the first space processing mode. The operations of the encoding, the modulation, and the space processing performed in the first space processing mode, which are implemented by the first node, are covered in the prior art, and are not detailed herein any further. The first space processing mode applied by the first node may be one of various existing space processing modes. If the UE fails in decoding the downlink data sent by the first node, the UE feeds back a NAK to the network side node (which may be the first node or another network side node).

In an implementation scenario where the first node is a retransmission node, in a way similar to the implementation scenario where the first node is an initial transmission node, the first node consecutively encodes and modulates the downlink data, performs space processing for the downlink data by using the first space processing mode, and then sends the downlink data to the UE. If the UE fails in decoding the downlink data sent by the first node, the UE feeds back a NAK to the network side node (which may be the first node or another network side node).

In the embodiment of the present invention, after the network side node receives the NAK that is fed back by the UE in response to the downlink data sent by the first node, the network side device may determine, according to the transmit power of each network side node and/or the downlink channel quality condition of each network side node and reported by the UE and the like, a second node for retransmitting the downlink data to the UE.

As a feasible implementation mode, the network side device may determine, according to the transmit power of each network side node, a second node for retransmitting the downlink data to the UE. For example, the network side device may select a node, whose transmit power is greater than that of the first node, as a second node for performing the retransmission. As another feasible implementation mode, the network side device may determine, according to the downlink channel quality condition of each network side node, a second node for retransmitting the downlink data to the UE. For example, the network side device may select a node, whose downlink channel quality is better than that of the first node, as a second node for performing the retransmission. Understandably, the network side device may also determine, according to the transmit power and the downlink channel quality condition of each network side node, a second node for retransmitting the downlink data to the UE. Besides, the network side device may also determine, according to other factors except the transmit power and the downlink channel quality condition, a second node for retransmitting the downlink data to the UE; or, determine, according to other factors as well as the transmit power and the downlink channel quality condition, a second node for performing the retransmission, which are not described herein exhaustively.

After determining a second node for performing the retransmission, the network side device may further determine, according to the downlink channel quality condition of the determined second node, a second space processing mode for the second node to perform space processing for the downlink data; or, the second node may determine, according to factors such as its own downlink channel quality condition, a second space processing mode for performing space processing for the downlink data.

In order to improve the retransmission success rate, the second space processing mode applied by the second node to the downlink data may be different from the first space processing mode applied by the first node to the downlink data. As a feasible implementation mode, the number of antennas and/or antenna ports used by the second node for sending the downlink data may be different from the number of antennas or antenna ports used by the first node for sending the downlink data. For example, the first node may use four antennas to send the downlink data while the second node may use two antennas to send the downlink data. As another feasible implementation mode, the number of transmission layers used by the second node for sending the downlink data may be different from the number of transmission layers used by the first node for sending the downlink data. For example, the first node may map the downlink data into two layers of data streams and send the data to the UE while the second node may map the downlink data into three layers of data streams and send the data to the UE. As another feasible implementation mode, the number of antennas and/or antenna ports used by the second node for sending the downlink data may be different from the number of antennas or antenna ports used by the first node for sending the downlink data, and the number of transmission layers used by the second node for sending the downlink data may be different from the number of transmission layers used by the first node for sending the downlink data. For example, the first node may map the downlink data into two layers of data streams, and use two antenna ports to send the data to the UE while the second node may map the downlink data into three layers of data streams, and use four antenna ports to send the data to the UE.

The network side device may control the first node, the second node, or any one network side node to send the second space processing mode to the terminal so that the terminal can decode in the second space processing mode the downlink data received from the second node. The second space processing mode may be the number of transmission layers used by the second node for sending the downlink data, or may be precoding of the second node, or may be a data mapping mode of the second node, and the like, or may be any combination thereof.

After the second node is determined, the network side device may control the second node to perform space processing for the downlink data by using the second space processing mode and then retransmit the downlink data to the terminal; and, under control of the network side device, the second node may perform space processing for the downlink data by using the second space processing mode determined by the network side device or the second space processing mode determined by the second node, and then retransmit the downlink data to the UE.

After receiving the downlink data retransmitted by the second node, the UE may perform, according to the second space processing mode, a corresponding decoding operation for the downlink data to obtain original downlink data.

With the retransmission method provided in the embodiment of the present invention, after a first node fails in sending downlink data to a terminal, a network side device may determine a second node on the network side as a retransmission node, and control the second node to perform space processing for the downlink data in a way different from the space processing mode of the first node and then retransmit the downlink data to the terminal, thereby improving retransmission success rate and system stability.

Figure 2:
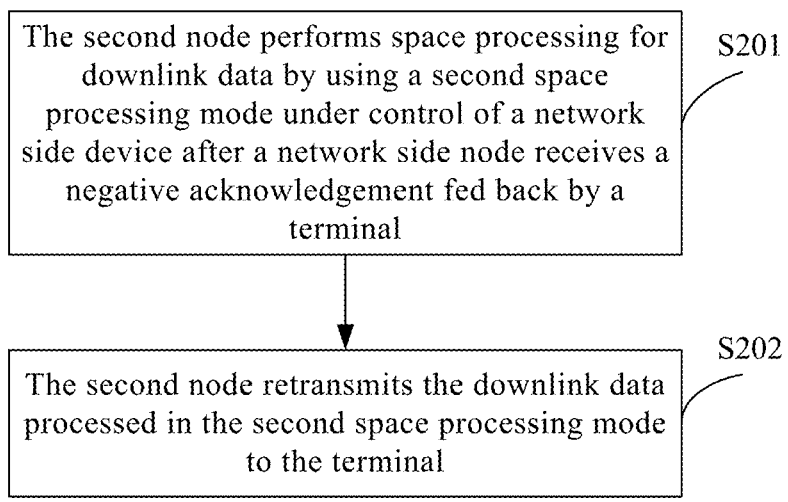
FIG. 2 is a flowchart of a retransmission method according to another embodiment of the present invention.

FIG. 2 is a flowchart of a retransmission method according to another embodiment of the present invention. As shown in FIG. 2, the method includes:

S201. A second node performs space processing for downlink data by using a second space processing mode under control of a network side device after a network side node receives a negative acknowledgement fed back by a terminal, where the negative acknowledgement is used to indicate that the terminal fails in decoding downlink data sent by a first node, and the second space processing mode is different from a first space processing mode applied by the first node to the downlink data.

S202. The second node retransmits the downlink data processed in the second space processing mode to the terminal.

As a subject for performing the above steps, the second node is a retransmission node, and specifically, may be an AP, an RRE, an RRH, or an RRU, and the like.

After the network side node (which may be the first node, or another network side node) receives a NAK that is fed back by the UE in response to the downlink data sent by the first node, the network side device may determine, according to the transmit power of each network side node and/or the downlink channel quality condition of each network side node and reported by the UE, and the like, a second node for retransmitting the downlink data to the UE. The second node may be a node whose transmit power is greater than that of the first node, or a node whose downlink channel quality is better than that of the first node. Specifically, the network side device may determine, according to other factors except the transmit power and the downlink channel quality condition, a second node for retransmitting the downlink data to the UE; or, determine, according to other factors as well as the transmit power and the downlink channel quality condition, a second node for performing the retransmission.

After determining a second node for performing the retransmission, the network side device may further determine, according to the downlink channel quality condition of the determined second node, a second space processing mode for the second node to perform space processing for the downlink data; or, the second node may determine, according to its own conditions, a second space processing mode for performing space processing for the downlink data.

In order to improve the retransmission success rate, the second space processing mode applied by the second node to the downlink data may be different from the first space processing mode applied by the first node to the downlink data. As a feasible implementation mode, the number of antennas or antenna ports used by the second node for sending the downlink data may be different from the number of antennas or antenna ports used by the first node for sending the downlink data. As another feasible implementation mode, the number of transmission layers used by the second node for sending the downlink data may be different from the number of transmission layers used by the first node for sending the downlink data. As another feasible implementation mode, the number of antennas or antenna ports used by the second node for sending the downlink data may be different from the number of antennas or antenna ports used by the first node for sending the downlink data, and the number of transmission layers used by the second node for sending the downlink data may be different from the number of transmission layers used by the first node for sending the downlink data.

After the second node is determined, the network side device may control the second node to perform space processing for the downlink data by using the second space processing mode and then retransmit the downlink data to the terminal; and, under control of the network side device, the second node may perform space processing for the downlink data by using the second space processing mode determined by the network side device or the second space processing mode determined by the second node, and then retransmit the downlink data to the UE.

After receiving the downlink data retransmitted by the second node, the UE may perform, according to the second space processing mode, perform a corresponding decoding operation for the downlink data to obtain original downlink data.

Optionally, after determining the second node and the second space processing mode, the network side device may control the second node to send the second space processing mode to the terminal so that the terminal can decode in the second space processing mode the downlink data received from the second node. The second space processing mode may be the number of transmission layers used by the second node for sending the downlink data, or may be precoding of the second node, or may be a data mapping mode of the second node, and the like, or may be any combination thereof.

With the retransmission method provided in this embodiment, after a first node fails in sending downlink data to a terminal, a network side device may determine a second node on the network side as a retransmission node. Under control of the network side device, the second node may perform space processing for the downlink data in a way different from the space processing mode of the first node and then retransmit the downlink data to the terminal, thereby improving the retransmission success rate and system stability.

Figure 3:
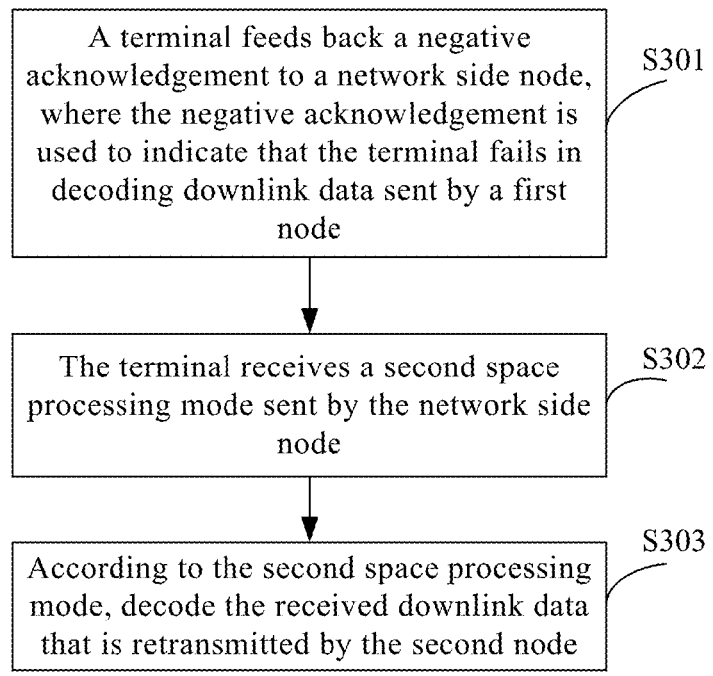
FIG. 3 is a flowchart of a retransmission method according to still another embodiment of the present invention.

FIG. 3 is a flowchart of a retransmission method according to still another embodiment of the present invention. As shown in FIG. 3, the method includes the following steps:

S301. A terminal feeds back a negative acknowledgement to a network side node, where the negative acknowledgement is used to indicate that the terminal fails in decoding downlink data sent by a first node.

S302. The terminal receives a second space processing mode sent by the network side node, where the second space processing mode is used to indicate a space processing mode applied by a second node to the downlink data, and the second space processing mode is different from a first space processing mode applied by the first node to the downlink data.

S303. Decode, according to the second space processing mode, the received downlink data that is retransmitted by the second node.

The first node may be an initial transmission node, and the second node may be a retransmission node; or, both the first node and the second node are retransmission nodes, and the second node may be a node that retransmits the downlink data to the terminal again when the first node fails in retransmitting the downlink data to the terminal. The first node and the second node may specifically be an AP, an RRE, an RRH, or an RRU, and the like.

In an implementation scenario where the first node is an initial transmission node or a retransmission node, the first node may encode and modulate the downlink data to be sent to the UE, and then perform space processing for the downlink data by using the first space processing mode. If the UE fails in decoding the downlink data sent by the first node, the UE feeds back a NAK to the network side node (which may be the first node or another network side node).

After the network side node receives the NAK that is fed back by the UE in response to the downlink data sent by the first node, the network side device may determine, according to the transmit power of each network side node and/or the downlink channel quality condition of each network side node and reported by the UE, and the like, a second node for retransmitting the downlink data to the UE. Further, the network side device may determine, according to the downlink channel quality condition of the determined second node, a second space processing mode for the second node to perform space processing for the downlink data; or, the second node may determine, according to its own conditions, a second space processing mode for performing space processing for the downlink data.

In order to improve the retransmission success rate, the second space processing mode applied by the second node to the downlink data may be different from the first space processing mode applied by the first node to the downlink data. Specifically, the number of antennas or antenna ports used by the second node for sending the downlink data may be different from the number of antennas or antenna ports used by the first node for sending the downlink data; or, the number of transmission layers used by the second node for sending the downlink data may be different from the number of transmission layers used by the first node for sending the downlink data; or, the number of antennas or antenna ports used by the second node for sending the downlink data may be different from the number of antennas or antenna ports used by the first node for sending the downlink data, and the number of transmission layers used by the second node for sending the downlink data may be different from the number of transmission layers used by the first node for sending the downlink data.

The network side device may control the first node, the second node, or any one network side node to send the second space processing mode to the terminal. The second space processing mode received by the terminal may be the number of transmission layers used by the second node for sending the downlink data, or may be precoding of the second node, or may be a data mapping mode of the second node, and the like, or may be any combination thereof.

After receiving the downlink data retransmitted by the second node, the UE may perform, according to the second space processing mode, a corresponding decoding operation for the downlink data to obtain original downlink data.

With the retransmission method provided in this embodiment, a terminal returns a NAK to a network side after the terminal fails in decoding downlink data sent by a first node, the network side device may determine a second node on the network side as a retransmission node, and control the second node to perform space processing for the downlink data in a way different from the space processing mode of the first node and then retransmit the downlink data to the terminal; the network side further sends a second space processing mode of the second node to the terminal, and the terminal may decode in the second space processing mode the downlink data retransmitted by the second node, thereby improving retransmission success rate and system stability.

The above embodiments describe the retransmission method provided in the embodiments of the present invention from the perspective of the network side device, the second node, and the terminal, respectively. The following embodiments describes the retransmission method provided in the embodiments of the present invention in detail from the perspective of the specific implementation mode of the second node determined by the network side device, the second space processing mode applied by the second node, and the second space processing mode sent by the network side device to the terminal, respectively.

In an embodiment in which the network side device determines a second node, as a feasible implementation mode, the network side device may determine, according to the transmit power of the first node and the transmit power of other network side nodes, a second node for retransmitting downlink data to the terminal. In response to the downlink data sent by the first node, the terminal feeds back a NAK to the network side node (which may be the first node or another network side node). Therefore, in order to improve the retransmission success rate, the transmit power of the second node may be different from that of the first node.

Figure 4:
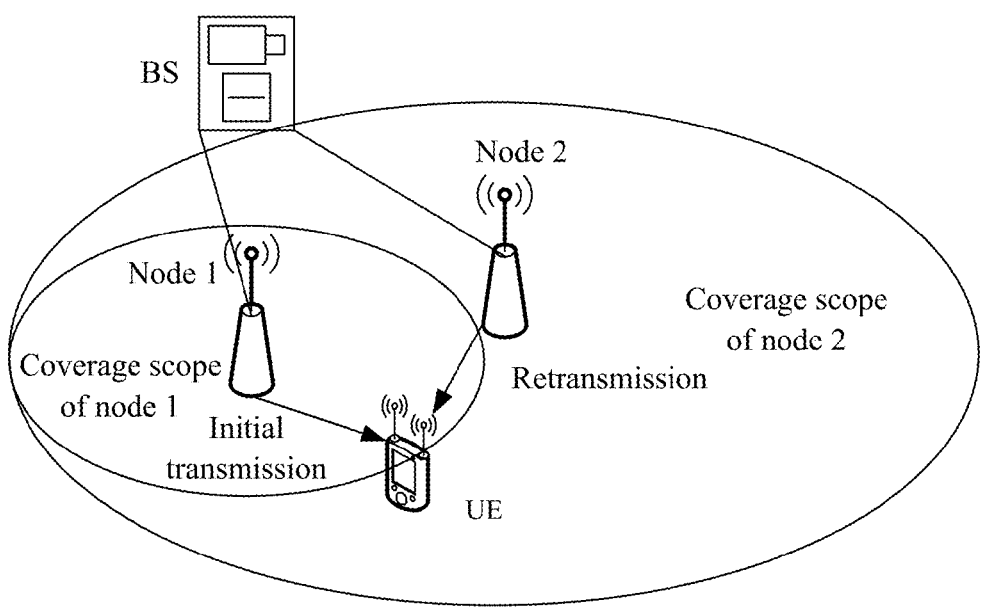
FIG. 4 is a schematic diagram of node transmission in a retransmission method according to another embodiment of the present invention.

The node with a lower transmit power is generally vulnerable to interference caused by signals transmitted by the node with a higher transmit power on the network side. Therefore, in an implementation scenario of this embodiment, the network side device may use a node, whose transmit power is greater than that of the first node on the network side, as a second node. For example, as shown in FIG. 4, a node 1 is an initial transmission node, its maximum transmit power is 30 dBm, the maximum transmit power of a node 2 is 46 dBm, and the node 1 has a different coverage scope to the node 2. Because the node 2 has a higher power and tends to cause strong interference onto the signals sent by the node 1, the network side device (e.g., a base station (BS)) may determine the node 2 as a second node for retransmitting downlink data to the UE after the UE fails in decoding the downlink data initially transmitted by the node 1 to the UE. Because the interference on the node 2 is weaker than the interference on the node 1, the retransmission success rate is improved.

As another feasible implementation mode, the network side device may determine, according to downlink channel quality conditions of the first node and the second node, a second node for retransmitting the downlink data to the terminal. The terminal generally reports the downlink channel quality condition of each network side node to the network side device periodically. For a network side node, if the downlink channel quality is better, the success rate of sending the downlink data to the terminal is generally higher. Therefore, after the terminal returns a NAK to the network side node in response to the downlink data sent by the first node, in order to improve the retransmission success rate, the network side device may use a node, whose downlink channel quality is better than that of the first node on the network side, as a second node for retransmitting downlink signals to the terminal.

The second space processing mode applied by the second node may be determined by the network side device or by the second node. As a feasible implementation mode, the number of antennas and/or antenna ports used by the second node for sending the downlink data may be different from the number of antennas and/or antenna ports used by the first node for sending the downlink data.

A mapping relationship exists between the number of antennas and the number of antenna ports. For example, four antennas may be respectively used to send four different types of signals, and, in this case, the four antennas correspond to four antenna ports respectively; or, four antennas may be used to send two different types of signals, antenna 1 and antenna 2 may send one type of signals, and antenna 3 and antenna 4 may send another type of signals, and, in this case, the four antennas are mapped to two antenna ports respectively. Therefore, the number of antennas used by the second node for sending the downlink data may be different from the number of antennas used by the first node for sending the downlink data; or, the number of antenna ports used by the second node for sending the downlink data may be different from the number of antenna ports used by the first node for sending the downlink data; or, the number of antennas and the number of antenna ports used by the second node for sending the downlink data may be different from the number of antennas and the number of antenna ports used by the first node for sending the downlink data.

Figure 5:
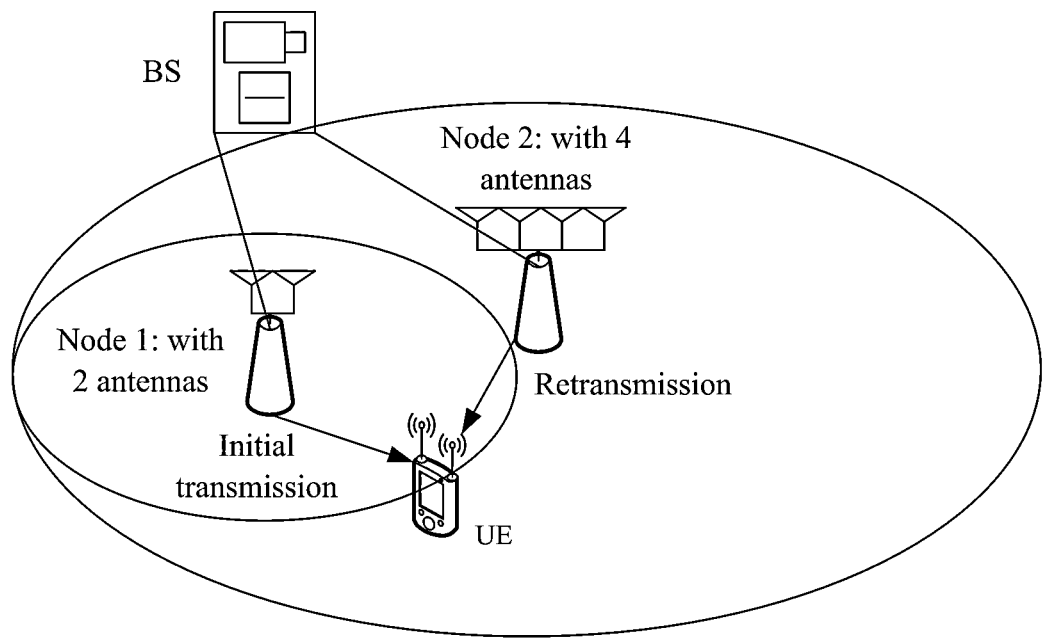
FIG. 5 is a schematic diagram of node transmission in a retransmission method according to another embodiment of the present invention.

Generally, if a node has more antennas or antenna ports, the transmission performance is better and the retransmission success rate is higher. Therefore, when determining the second space processing mode, the network side device or the second node may determine that the number of antennas and/or antenna ports used by the second node for sending the downlink data is greater than the number of antennas and/or antenna ports used by the first node for sending the downlink data, thereby improving retransmission success rate of the second node. As shown in FIG. 5, the initial transmission node 1 may initially transmit downlink data to the UE through two antenna ports; after the UE feeds back a NAK to the network side node due to decoding failure, the network side device may determine the node 2 as a retransmission node, the network side device or the node 2 may determine to use four antenna ports to retransmit the downlink data, and the node 2 uses four antenna ports to retransmit the downlink data to the UE under control of the network side device.

It should be noted that in some scenarios, for example, in a case that radio signal fading between the UE and the node 2 is less than the fading between the UE and the node 1, the channel status between the node 2 and the UE is better for transmitting downlink data. In this case, the number of antennas and/or antenna ports used by the second node for sending the downlink data may be equal to the number of antennas and/or antenna ports used by the first node for sending the downlink data, or may be less than the number of antennas and/or antenna ports used by the first node for sending the downlink data.

As another feasible implementation mode, the network side device or the second node may determine, according to the downlink channel quality condition of the second node, the number of transmission layers used by the second node for sending the downlink data, where the number of transmission layers used by the second node for sending the downlink data may be different from the number of transmission layers used by the first node for sending the downlink data.

For example, the first node may map the downlink data into two transmission layers and send the data to the UE. After the UE returns a NAK to the network side node due to failure of decoding the downlink data sent by the first node, the network side device may determine a second node for retransmitting the downlink data to the UE, and control the second node to map the downlink data into four transmission layers and send the data to the UE.

As another feasible implementation mode, the number of antennas and/or antenna ports used by the second node for sending the downlink data may be different from the number of antennas and/or antenna ports used by the first node for sending the downlink data, and the number of transmission layers used by the second node for sending the downlink data may be different from the number of transmission layers used by the first node for sending the downlink data. For example, the first node may map the downlink data into two transmission layers, and then send the downlink data to the UE through two antenna ports. The UE feeds back a NAK after failure of decoding, and the network side device may determine a second node, and control the second node to map the downlink data into three transmission layers and then retransmit the downlink data to the UE through four antenna ports.

It should be noted that after the network side device determines the second node for retransmitting the downlink data to the terminal, if the second node is able to send multiple layers of data streams from multiple antenna ports simultaneously, the network side device may determine, according to the downlink channel quality condition of the second node and reported by the terminal, a second space processing mode of the second node (specifically, determine the number of transmission layers of the downlink data of the second node) to improve overall downlink transmission efficiency while ensuring reliable transmission. For example, when the downlink channel quality condition of the second node is good for transmitting the downlink data, the network side device may determine more transmission layers so that the system efficiency is improved while the transmission reliability is ensured; when the downlink channel quality condition of the second node is not good for transmitting the downlink data, the network side device may determine fewer transmission layers to ensure the transmission reliability.

Figure 6:
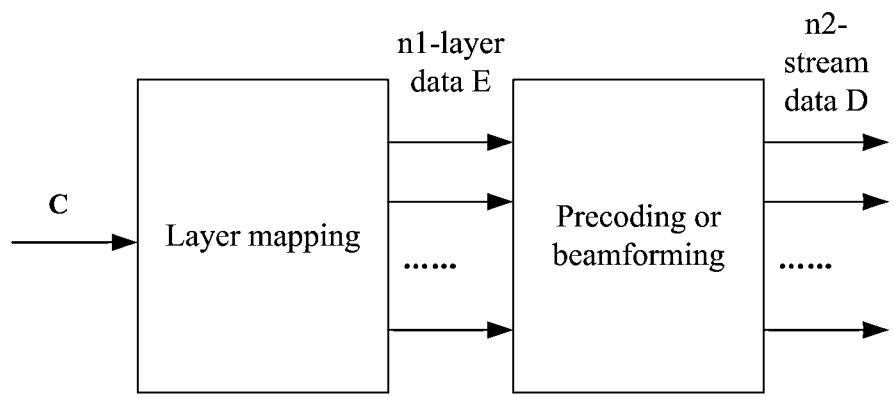
FIG. 6 is a schematic flowchart of space processing performed by a node for downlink data.

The process of a node performing space processing for downlink data may be shown in FIG. 6, where data C is encoded and modulated data, data C changes to data E inclusive of n1 layers after undergoing a layer mapping, and then changes to data D inclusive of n2 streams after undergoing precoding or beamforming, where n2≥n1. For example, data C whose length is N may change to two-layer data after undergoing a layer mapping, where the length of each layer of the data stream is N/2; and then change to 4-stream data after undergoing precoding or beamforming, where the size of a precoding matrix is n2×n1 (that is, 4×2), and the length of each stream is N/2.

Generally, the network side node sends a downlink reference signal (Reference Signal, RS) to the UE, and the UE measures the RS to obtain the downlink channel quality condition of the node and feeds the downlink channel quality condition to the network side device. For example, in an LTE system, the UE generally may feed back one or more types of the following information to the network side device: a rank indicator (RI), a precoding matrix indicator (PMI), and a channel quality indicator (QI). The RI is an identifier of the number of transmission layers recommended by the UE (a process from C to E shown in FIG. 6), the PMI is an identifier of the precoding matrix recommended by the UE (a process from E to D shown in FIG. 6), and the CQI is an identifier of encoding and modulation recommended by the UE.

Figure 7:
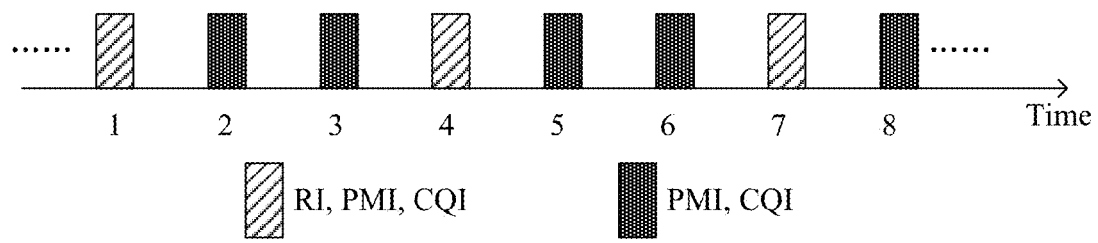
FIG. 7 is a schematic diagram of feeding back downlink channel quality information from a terminal to a network side.

Generally, the period for the UE to feed back the RI is greater than the period for the UE to feed back the PMI and the CQI. When the UE feeds back the PMI and the CQI, the UE performs calculation and feedback of the PMI and the CQI based on an assumption of an RI fed back previously. As shown in FIG. 7, the period for the UE to feed back the RI is 3, and the period for the UE to feed back the PMI and the CQI is 1. If the UE feeds back RI being equal to 3 at time point 4, the UE calculates and feeds back the PMI and the CQI based on an RI=3 assumption at time point 5 and time point 6. For example, for the PMI, the PMI is a sequence number of a precoding matrix most suitable for transmission based on an assumption of a specific number of transmission layers. Therefore, the UE selects a sequence number of a precoding matrix most suitable for transmission only among all precoding matrices corresponding to RI=3 (codebooks corresponding to RI=3).

After the UE returns a NAK to the network side node due to failure of decoding the downlink signals sent by the first node, the network side device may control the second node to retransmit the downlink data to the UE. If the number of transmission layers used by the second node for sending the downlink data is equal to that used by the first node, because the RI corresponding to the second node, which is fed back by the UE, is different from the RI corresponding to the first node, the network side device may be unable to determine a proper PMI for retransmission using the number of transmission layers of the first node, which leads to uncertainty of system stability. Therefore, in an implementation scenario of this embodiment, the number of transmission layers used by the second node for sending the downlink data may be different from the number of transmission layers used by the first node for sending the downlink data. Specially, the second node for retransmitting the downlink data to the UE is determined by the network side device according to channel quality, and the channel quality of the second node is generally better. Therefore, the number of transmission layers used by the second node for sending the downlink data may be greater than the number of transmission layers used by the first node for sending the downlink data, thereby improving the transmission efficiency. Specifically, the base station may determine, according to the RI fed back by the UE, the number of transmission layers suitable for the node 2 to retransmit the downlink data.

After determining the second node for retransmitting the downlink data to the UE, the network side device may control any network side node to send the second space processing mode used by the second node to the UE.

As a feasible implementation mode, if the second space processing mode differs from the first space processing mode in that the number of transmission layers used by the second node for sending the downlink data is different from the number of transmission layers used by the first node for sending the downlink data, the second space processing mode may include the number of transmission layers used by the second node for sending the downlink data.

For example, the network side device may control the second node to send the downlink data to the UE using n2 layers, where n2 may be greater than the number of transmission layers n1 used by the first node to send the downlink data to the UE. The network side device may send the number of transmission layers of the second node to the UE, which facilitates the UE to decode received signals correctly.

It should be noted that when the network side device controls the network side node to retransmit the downlink data to the terminal, the network side device may also control the network side node to use a default number of transmission layers for retransmitting the downlink data. In this case, the network side device does not need to control the network side node to send to the terminal, the number of transmission layers used by the second node for sending the downlink data.

As another feasible implementation mode, if the second space processing mode differs from the first space processing mode in that the number of antennas and/or antenna ports used by the second node for sending the downlink data is different from the number of antennas and/or antenna ports used by the first node for sending the downlink data, the second space processing mode may include the number of antennas and/or antenna ports used by the second node for sending the downlink data.

It should be noted that when the network side device controls the network side node to retransmit the downlink data to the terminal, the network side device may also control the network side node to use a default number of antennas and/or antenna ports for retransmitting the downlink data. In this case, the network side device does not need to control the network side node to send to the terminal, the number of antennas and/or antenna ports used by the second node for sending the downlink data.

After receiving the number of transmission layers of the downlink data and/or the number of antennas and/or antenna ports of the downlink data from the network side node, the terminal may demodulate the downlink data according to various methods provided in the prior art.

Figure 8:
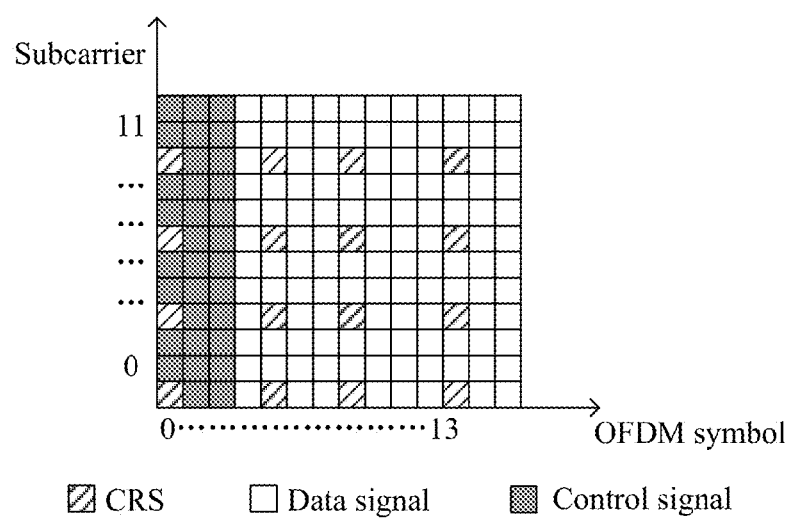
FIG. 8 is a schematic diagram of a mapping relationship between a CRS on a physical resource block and a data signal in an LTE system.

Multiple transmission modes generally exist in the current communication system, and each transmission mode corresponds to a different channel estimation mode. A channel estimation mode is used by a UE to estimate a channel traveled by a signal sent by a node, and facilitates the UE to perform decoding. For example, in an LTE system, a channel estimation mode is to estimate the channel by using a common reference signal (CRS). FIG. 8 is a schematic diagram of a mapping relationship between a CRS on a physical resource block (PRB) and a data signal in an LTE system. The CRS and the data signal are located on different time-frequency grid points. Because the channel fading undergone by the CRS is similar to the channel fading undergone by the data signal, the channel fading undergone by the data signal may be obtained by estimating the channel of the CRS.

For a transmission mode in which the UE uses a CRS to perform channel estimation, the UE performs precoding for only the sent data signal: Assuming that the data sent by the UE is S, and the precoding matrix is P, the channel traveled by the data signal is H, the data signal received by the UE is H×P×S+Nd, where Nd represents impact caused by noise onto the data. However, the UE performs no precoding for the sent CRS. Assuming that the CRS sent by the UE is Sc, the CRS received by the UE is H×Sc+Nc, where Nc represents impact caused by noise onto the CRS. After receiving the signal, the UE may use the CRS to estimate the channel H traveled by the CRS, and then decode the received data signal with reference to the precoding matrix P, so as to recover S.

Therefore, the second space processing mode sent by the network side node to the UE under control of the network side device may not only include the number of antennas and/or antenna ports used by the second node for sending the downlink data, and/or, the number of transmission layers used by the second node for sending the downlink data, but also include the precoding of the second node so that the UE can decode the downlink data, which is received from the second node, according to the precoding. The precoding may specifically include the number of transmission layers and a precoding matrix (for example, a precoding matrix index). According to the number of transmission layers, the UE may determine a codebook used for precoding, that is, determine the codebooks corresponding to the number of transmission layers in a set of precoding matrices used by the second node, and determine, according to the precoding matrices, the precoding matrix used by the second node among the determined codebooks used for precoding, and then decode, according to the precoding matrix, the received downlink data retransmitted by the second node. For example, the second node retransmits the downlink data to the UE through two antenna ports, where the number of transmission layers is 2. A codebook corresponding to transmission layer 1 includes twelve 2×1 precoding matrices, and a codebook corresponding to transmission layer 2 includes sixteen 2×2 precoding matrices. When the network side device sends the number of transmission layers of the second node (for example, the number of transmission layers is 2) and a precoding matrix numbered 3 among the precoding matrices to the UE, then the UE may find a precoding matrix numbered 3 among the 16 precoding matrices in the codebooks corresponding to the number of transmission layers "2", and decode the received downlink data retransmitted by the second node.

Further, to improve the success rate of the UE in decoding the downlink data retransmitted by the second node, the second space processing mode sent by the network side node to the UE under control of the network side device may further include a data mapping mode of the second node.

Figure 9:
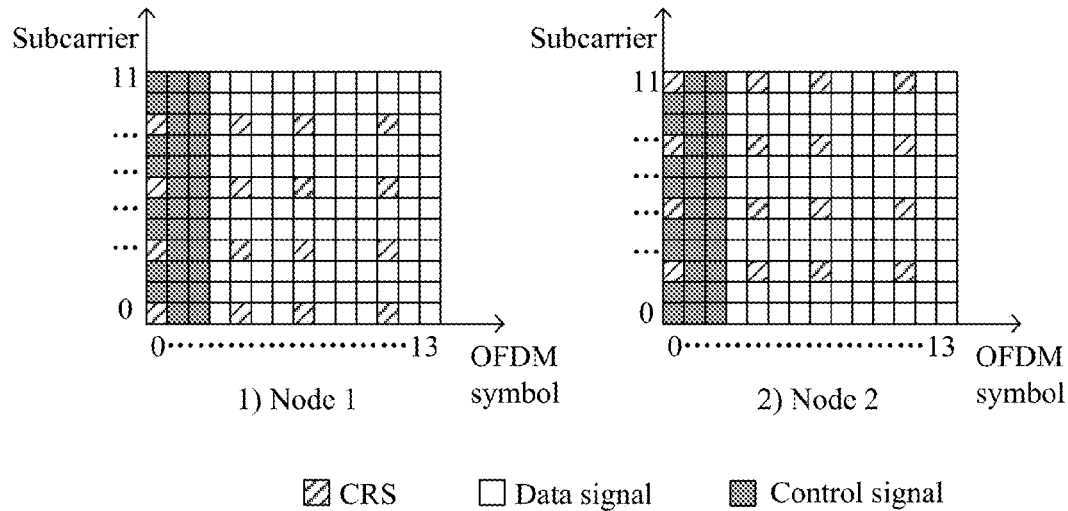
FIG. 9 is a schematic diagram of a time-frequency grid point used by a node 1 and a node 2 for sending downlink data.

In an LTE system, a node generally corresponds to a cell, and the CRS of each different cell generally has a different time-frequency grid point. Because the CRS and the data signal are located in different time-frequency grid points, the time-frequency grid point used by the first node for sending a data signal is different from the time-frequency grid point used by the second node for sending the data signal. FIG. 9 is a schematic diagram of a time-frequency grid point used by a node 1 and a node 2 for sending downlink data. Therefore, the network side device may send a data mapping mode of the second node to the UE; and, conveniently, according to the data mapping mode information of the second node, the UE maps the received downlink data retransmitted by the second node into a time-frequency grid point suitable for the node, that is, into a time-frequency grid point of neither a CRS nor a control signal.

In an implementation scenario of this embodiment, the data mapping mode of the second node may be a cell identifier (ID) of the second node, and the UE may determine, according to the cell ID, a data mapping mode of the downlink data retransmitted by the second node. For example, in an LTE system, the time-frequency grid point of the CRS is correlated with the cell ID. Specifically, the subcarrier shift of the CRS is $v_{shift}=N_{ID}^{cell} \mod 6$ where $N_{ID}^{cell}$ represents cell ID, and mod represents a modulo operation (7 mod6=1, 12 mod6=0). For example, when the cell IDs of the node 1 and the node 2 are 0 and 2 respectively, the time-frequency grid point used by the downlink data is shown in FIG. 9. Therefore, if the BS sends the cell ID of the node 2 to the UE and controls the node 2 to retransmit the downlink data to the UE, the UE may determine, according to the cell ID of the node 2, a time-frequency grid point of the CRS retransmitted by the node 2, and thus the UE may determine a blank time-frequency grid point except the CRS and the control signal as a time-frequency grid point of the data signal sent by the second node.

In another implementation mode in this embodiment, the network side device may further control the network side node to send a set of candidate cell IDs to the UE beforehand. The data mapping mode in the second space processing mode sent by the network side node to the UE under control of the network side device may be a cell indicator. The UE may determine the cell ID among the set of candidate cell IDs according to the cell indicator and thus determine the data mapping mode. For example, information of a set of cell IDs sent by the network side node to the UE includes IDs of cells 1, 2, 3, and 4, which may be respectively identified by codes 00, 01, 10, and 11. When the network side device controls the network side node to send data mapping mode 01 to the UE, the UE may use the cell ID of the cell 2 to determine the data mapping mode. The information of the set of cell IDs may be sent to the UE periodically through higher-layer signaling, and specifically, may be sent at long intervals to reduce signaling overhead.

In still another implementation scenario of this embodiment, the data mapping mode of the second node may also be a subcarrier shift of the reference signal RS, and the UE determines, according to the subcarrier shift of the reference signal RS, a data mapping mode of the downlink data retransmitted by the second node. The UE may also determine the time-frequency grid point of the downlink data according to the subcarrier shift. The network side node may use several bits such as 3 bits to express the subcarrier shift to reduce signaling overhead between the network and the UE.

In yet another implementation scenario of this embodiment, the data mapping mode of the second node may further include the number of antennas and/or antenna ports of the RS, and the UE determines, according to the number of antennas and/or antenna ports, a data mapping mode. That is because, in a communication system such as an LTE system, the time-frequency grid point of the CRS is correlated with the number of antenna ports. The number of time-frequency grid points of the CRS in a PRB is 8×N_ant, where N_ant represents the number of antenna ports. For example, when the number of antenna ports of the node 1 and the node 2 is 1 and 2 respectively, the time-frequency grid points used by the downlink data signal may be shown in FIG. 10, and are 8 and 16 time-frequency grid points respectively. Therefore, if the data mapping mode is the number of antenna ports of the node 2, the UE may determine, according to the number of antenna ports of the node 2, the time-frequency grid point of the CRS sent by the node 2, and further determine the time-frequency grid point of the downlink data.

Figure 10:
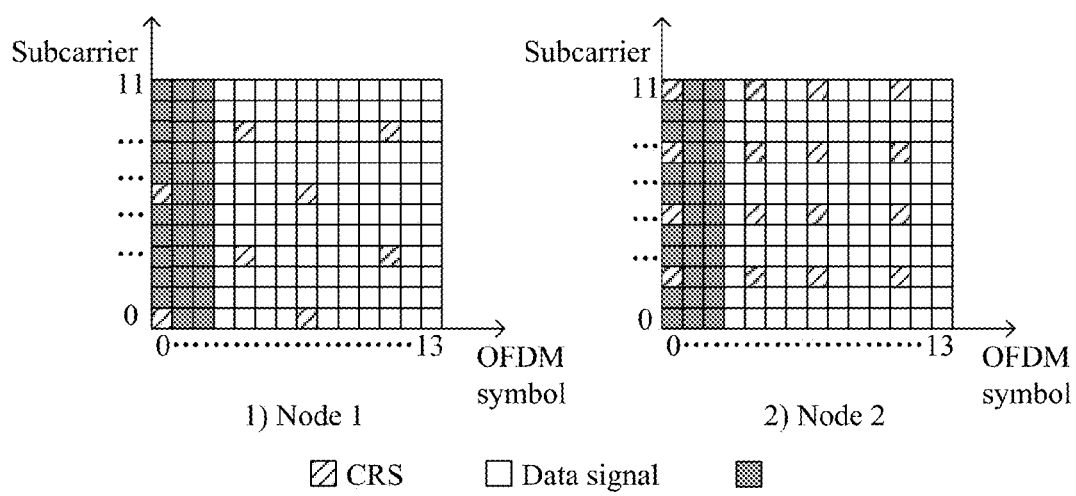
FIG. 10 is a schematic diagram of a time-frequency grid point used by a node 1 and a node 2 for sending downlink data.

In yet another implementation scenario of this embodiment, the data mapping mode of the second node may be rate matching. For example, as shown in FIG. 10, the node 2 sends 200 data bits to the UE, which occupy 120 time-frequency grid points in total. Therefore, the transmission rate of each time-frequency grid point is 200/120, that is, the rate matching of the node 2 may be 200/120. The node 1 sends 200 data bits to the UE, which occupy 126 time-frequency grid points in total; the transmission rate of each time-frequency grid point is 200/126, that is, the rate matching of the node 1 may be 200/126. Therefore, the UE may determine the time-frequency grid point of the downlink data according to the rate matching of the node.

Figure 11:
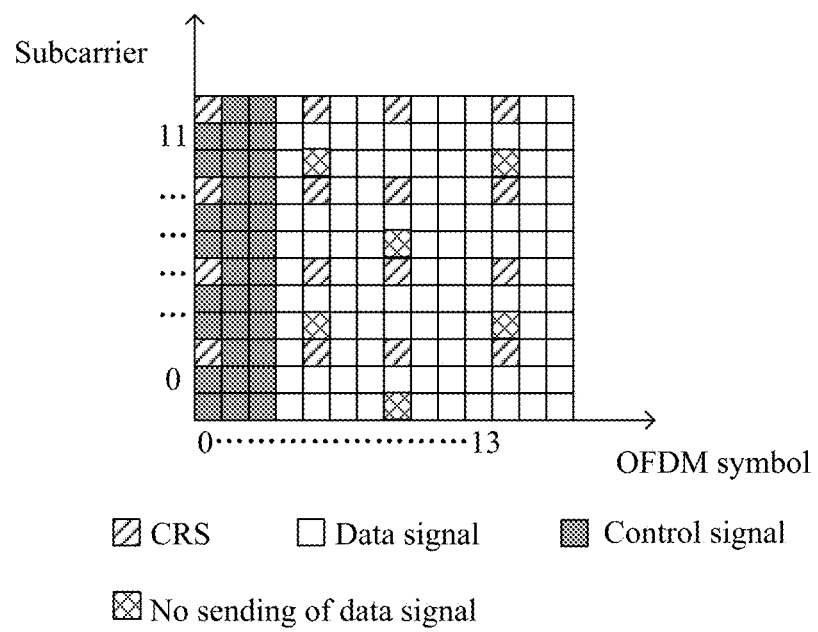
FIG. 11 is a schematic mapping diagram of downlink data sent by a node 2.

In another implementation scenario of this embodiment, the data mapping mode of the second node may be a time-frequency grid point corresponding to a downlink RS sent by the second node. Assuming that the CRS time-frequency grid points of the node 1 and the node 2 is shown in the figure, if strong interference exists between the node 1 and the node 2, the network side device may control the node 2 to perform mapping and avoid mapping of the downlink data into the time-frequency grid points corresponding to the RSs corresponding to the node 1 and the node 2. For example, the downlink data may be mapped in the way shown in FIG. 11. That is, no data signal is sent on the CRS time-frequency grid points of the node 1 or the node 2, thereby avoiding strong interference caused by the CRS sent by the node 1 onto the time-frequency grid point of the CRS sent by the node 1, and further ensuring reliability of sending data signals from the node 2 to the UE.

It should be noted that the RS mentioned in the above embodiment may include a CRS or a demodulation reference signal (DM RS). The UE may apply not only the transmission mode that uses a CRS to perform channel estimation, but also the transmission mode that uses a DM RS to perform channel estimation. If the UE uses a CRS to perform channel estimation, the second space processing mode sent by the network side node to the UE under control of the network side device may further include the precoding of the second node and/or the data mapping mode of the second node; if the UE uses a DM RS to perform channel estimation, the second space processing mode sent by the network side node to the UE under control of the network side device may exclude the precoding of the second node and/or the data mapping mode of the second node.

In the above embodiment, the second space processing mode sent by the network side node to the UE under control of the network side device may be carried in a variety of control signaling, for example, a physical downlink control channel (PDCCH), higher-layer signaling over a physical downlink shared channel (PDSCH), or an enhanced-physical downlink control channel (E-PDCCH), and the like.

Person of ordinary skill in the art may understand that all or a part of the processes of the methods in the embodiments may be implemented by a computer program instructing relevant hardware. The program may be stored in a computer readable storage medium. When the program is run, the processes of the methods in the embodiments are performed. The storage medium may be a magnetic disk, an optical disk, a Read-Only Memory (ROM), or a Random Access Memory (RAM).

Figure 12:
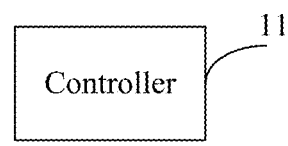
FIG. 12 is a schematic structural diagram of a network side device according to an embodiment of the present invention.

FIG. 12 is a schematic structural diagram of a network side device according to an embodiment of the present invention. As shown in FIG. 12, the network side device includes a controller 11.

The controller 11 is configured to control a network side node to send a second space processing mode to a terminal after the network side node receives a negative acknowledgement fed back by the terminal, and further configured to control a second node to perform space processing for downlink data by using the second space processing mode and then retransmit the downlink data to the terminal, where the negative acknowledgement is used to indicate that the terminal fails in decoding the downlink data sent by a first node, the second space processing mode is used to indicate a space processing mode applied by the second node to the downlink data, and the second space processing mode is different from a first space processing mode applied by the first node to the downlink data.

Further, the controller 12 may be configured to determine a second node according to the transmit power and/or downlink channel quality of the network side node.

As a feasible implementation mode, the difference between the first space processing mode and the second space processing mode may lie in that: The number of antennas and/or antenna ports used by the second node for sending the downlink data is different from the number of antennas and/or antenna ports used by the first node for sending the downlink data.

Correspondingly, the second space processing mode may include antennas and/or antenna ports used by the second node for sending the downlink data.

As another feasible implementation mode, the difference between the first space processing mode and the second space processing mode may further lie in that: The number of transmission layers used by the second node for sending the downlink data is different from the number of transmission layers used by the first node for sending the downlink data.

Correspondingly, the second space processing mode includes the number of transmission layers used by the second node for sending the downlink data.

Optionally, the second space processing mode may further include precoding of the second node and/or a data mapping mode of the second node.

Further, the controller 12 may be configured to determine a second space processing mode according to downlink channel quality of the second node and fed back by the terminal.

The network side device provided in the embodiment of the present invention corresponds to the retransmission method provided in the embodiment of the present invention, and is a device for executing the retransmission method, and may be specifically a BS, an eNodeB in an LTE system, and the like. For the detailed process of executing the retransmission method thereof, reference may be made to the method embodiment, and no repeated description is given herein any further.

With the network side device provided in the embodiment of the present invention, after a first node fails in sending downlink data to a terminal, the network side device may determine a second node on the network side as a retransmission node, and control the second node to perform space processing for the downlink data in a way different from the space processing mode of the first node and then retransmit the downlink data to the terminal, thereby improving retransmission success rate and system stability.

Figure 13:
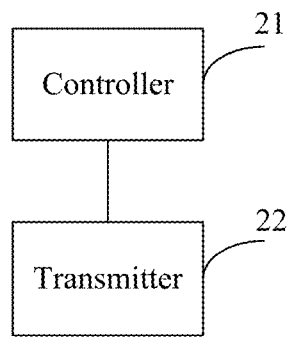
FIG. 13 is a schematic structural diagram of a node according to an embodiment of the present invention.

FIG. 13 is a schematic structural diagram of a node according to an embodiment of the present invention. As shown in FIG. 13, the node may include a processor 21 and a transmitter 22.

The processor 21 is configured to perform space processing for downlink data by using a second space processing mode under control of a network side device after a network side node receives a negative acknowledgement fed back by a terminal, where the negative acknowledgement is used to indicate that the terminal fails in decoding downlink data sent by a first node, and the second space processing mode is different from a first space processing mode applied by the first node to the downlink data.

The transmitter 22 is configured to retransmit the downlink data processed in the second space processing mode to the terminal.

The node provided in the embodiment of the present invention corresponds to the retransmission method provided in the embodiment of the present invention, and is a device for executing the retransmission method, and may be specifically an AP, an RRE, RRH, or an RRU, and the like. For the detailed process of executing the retransmission method thereof, reference may be made to the method embodiment, and no repeated description is given herein any further.

With the node provided in this embodiment, after a first node fails in sending downlink data to a terminal, a network side device may determine a second node on the network side as a retransmission node. Under control of the network side device, the second node may perform space processing for the downlink data in a way different from the space processing mode of the first node and then retransmit the downlink data to the terminal, thereby improving retransmission success rate and system stability.

Figure 14:
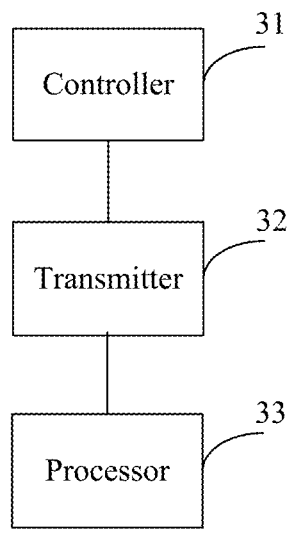
FIG. 14 is a schematic structural diagram of a terminal according to an embodiment of the present invention.

FIG. 14 is a schematic structural diagram of a terminal according to an embodiment of the present invention. As shown in FIG. 14, the terminal may include a transmitter 31, a receiver 32, and a processor 33.

The transmitter 31 is configured to feed back a negative acknowledgement to a network side node, where the negative acknowledgement is used to indicate that the terminal fails in decoding downlink data sent by a first node.

The receiver 32 is configured to receive a second space processing mode sent by the network side node, where the second space processing mode is used to indicate a space processing mode applied by a second node to the downlink data, and the second space processing mode is different from a first space processing mode applied by the first node to the downlink data.

The processor 33 is configured to decode, according to the second space processing mode, the received downlink data that is retransmitted by the second node.

As a feasible implementation mode, the difference between the first space processing mode and the second space processing mode may lie in that: The number of antennas or antenna ports used by the second node for sending the downlink data is different from the number of antennas or antenna ports used by the first node for sending the downlink data.

Correspondingly, the second space processing mode received by the receiver 32 may include antennas and/or antenna ports used by the second node for sending the downlink data.

As another feasible implementation mode, the difference between the first space processing mode and the second space processing mode may lie in that: The number of transmission layers used by the second node for sending the downlink data is different from the number of transmission layers used by the first node for sending the downlink data.

Correspondingly, the second space processing mode received by the receiver 32 may include the number of transmission layers used by the second node for sending the downlink data.

Optionally, the second space processing mode received by the receiver 32 may further include precoding of the second node and/or a data mapping mode of the second node.

The terminal provided in the embodiment of the present invention corresponds to the retransmission method provided in the embodiment of the present invention, and is a device for executing the retransmission method. For the detailed process of executing the retransmission method thereof, reference may be made to the method embodiment, and no repeated description is given herein any further.

The terminal provided in this embodiment returns a NAK to a network after the terminal fails in decoding downlink data sent by a first node, the network side device may determine a second node on the network side as a retransmission node, and control the second node to perform space processing for the downlink data in a way different from the space processing mode of the first node and then retransmit the downlink data to the terminal; the network side further sends a second space processing mode of the second node to the terminal, and the terminal may decode in the second space processing mode the downlink data retransmitted by the second node, thereby improving retransmission success rate and system stability.

Finally, it should be noted that the foregoing embodiments are merely provided for describing the technical solutions of the present invention, but not intended to limit the present invention. It should be understood by persons of ordinary skill in the art that although the present invention has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the spirit and scope of the present invention.

What is claimed is:

1. A retransmission method, comprising:
   controlling, by a network side device, a network side node to send a second space processing mode to a terminal after the network side node receives a negative acknowledgement fed back by the terminal, wherein the negative acknowledgement is used to indicate that the terminal fails in decoding downlink data sent by a first node, wherein the second space processing mode is used to indicate a space processing mode applied by a second node to the downlink data, and wherein the second space processing mode is different than a first space processing mode applied by the first node to the downlink data; and
   controlling, by the network side device, the second node to perform space processing for the downlink data using the second space processing mode, and then to retransmit the downlink data to the terminal;
   wherein a difference between the first space processing mode and the second space processing mode comprises the second node using a different number of antennas than the first node, a different number of antenna ports than the first node, or both when sending the downlink data to the terminal.

2. The method according to claim 1, wherein before controlling the network side node to send a second space processing mode to a terminal, the method further comprises:
   determining the second node according to at least one of a transmit power and downlink channel quality of the network side node.

3. The method according to claim 1, wherein the difference between the first space processing mode and the second space processing mode further comprises the second node using a different number of transmission layers than the first node when sending the downlink data to the terminal.

4. The method according to claim 1, wherein the second space processing mode further comprises at least one of a precoding mode of the second node and a data mapping mode of the second node.

5. The method according to claim 4, wherein the data mapping mode comprises one or a combination of a cell identifier of the second node, a subcarrier shift for the second node to send a downlink reference signal (RS), a number of antennas or antenna ports for the second node to send the downlink RS, a time-frequency grid point corresponding to the downlink RS sent by the second node, and a rate matching of the downlink data sent by the second node.

6. A retransmission method, comprising:
   performing, by a second node, space processing for downlink data using a second space processing mode under control of a network side device after a network side node receives a negative acknowledgement fed back by a terminal, wherein the negative acknowledgement is used to indicate that the terminal fails in decoding the downlink data sent by a first node, and wherein the second space processing mode is different than a first space processing mode applied by the first node to the downlink data, and wherein a difference between the first space processing mode and the second space processing mode comprises the second node using a different number of transmission layers than the first node when sending the downlink data to the terminal; and
   retransmitting, by the second node, the downlink data processed in the second space processing mode to the terminal.

7. The method according to claim 6, wherein before the performing space processing for downlink data by using a second space processing mode, the method further comprises:
   receiving, by the second node, the second space processing mode sent by the network side device, wherein the second space processing mode is determined by the network side device according to downlink channel quality of the second node and fed back by the terminal.

8. The method according to claim 6, wherein before the performing space processing for downlink data by using a second space processing mode, the method further comprises:
   determining, by the second node, the second space processing mode.

9. The method according to claim 6, wherein before the performing processing for downlink data by using a second space processing mode, the method further comprises:
   sending, by the second node, the second space processing mode to the terminal under control of the network side device.

10. A retransmission method, comprising:
feeding back, by a terminal, a negative acknowledgement to a network side node, wherein the negative acknowledgement is used to indicate that the terminal fails in decoding downlink data sent by a first node;
receiving, by the terminal, a second space processing mode sent by the network side node, wherein the second space processing mode is used to indicate a space processing mode applied by a second node to the downlink data, and wherein the second space processing mode is different than a first space processing mode applied by the first node to the downlink data; and
decoding, according to the second space processing mode, the received downlink data that is retransmitted by the second node;
wherein the difference between the first space processing mode and the second space processing mode comprises the second node using a different number of antennas than the first node, a different number of antenna ports than the first node, or both when sending the downlink data to the terminal.

11. The method according to claim 10, wherein the second space processing mode further comprises at least one of a precoding mode of the second node and a data mapping mode of the second node, and wherein the data mapping mode comprises one or a combination of a cell identifier of the second node, a subcarrier shift for the second node to send a downlink reference signal (RS), a number of antennas or antenna ports for the second node to send the downlink RS, a time-frequency grid point corresponding to the downlink RS sent by the second node, and a rate matching of the downlink data sent by the second node.

12. The method according to claim 10, wherein the second space processing mode further comprises at least one of a precoding mode of the second node and a data mapping mode of the second node.

13. A network side device, comprising:
a controller, configured to control a network side node to send a second space processing mode to a terminal after the network side node receives a negative acknowledgement fed back by the terminal, and to both control a second node to perform space processing for downlink data by using the second space processing mode and retransmit the downlink data to the terminal, wherein the negative acknowledgement is used to indicate that the terminal fails in decoding the downlink data sent by a first node, wherein the second space processing mode is used to indicate a space processing mode applied by the second node to the downlink data, and wherein the second space processing mode is different than a first space processing mode applied by the first node to the downlink data;
wherein a difference between the first space processing mode and the second space processing mode comprises the second node using a different number of antennas than the first node, a different number of antenna ports than the first node, or both when sending the downlink data to the terminal.

14. The network side device according to claim 13, wherein the controller is further configured to determine the second node according to at least one of a transmit power of the network side node and a downlink channel quality of the network side node.

15. A node, comprising:
a processor, configured to perform space processing for downlink data by using a second space processing mode under control of a network side device after a network side node receives a negative acknowledgement fed back by a terminal, wherein the negative acknowledgement is used to indicate that the terminal fails in decoding downlink data sent by a first node, and wherein the second space processing mode is different than a first space processing mode applied by the first node to the downlink data; and
a transmitter, configured to retransmit the downlink data processed in the second space processing mode to the terminal;
wherein a difference between the first space processing mode and the second space processing mode comprises the second node using a different number of transmission layers than the first node when sending the downlink data to the terminal.

16. A terminal, comprising:
a transmitter, configured to feed back a negative acknowledgement to a network side node, wherein the negative acknowledgement is used to indicate that the terminal fails in decoding downlink data sent by a first node;
a receiver, configured to receive a second space processing mode sent by the network side node, wherein the second space processing mode is used to indicate a space processing mode applied by a second node to the downlink data, and wherein the second space processing mode is different than a first space processing mode applied by the first node to the downlink data; and
a processor, configured to decode, according to the second space processing mode, the received downlink data that is retransmitted by the second node:
wherein the second space processing mode received by the receiver comprises a different number of antennas, a different number of antenna ports, or both than the second node used to send the downlink data to the terminal.

17. The terminal according to claim 16, wherein the second space processing mode received by the receiver further comprises a different number of transmission layers than the second node used to send the downlink data to the terminal.

* * * * *